(12) United States Patent
Shi

(10) Patent No.: US 7,116,674 B2
(45) Date of Patent: Oct. 3, 2006

(54) METHOD AND APPARATUS FOR DIGITAL SUBSCRIBER LINE ACCESS MULTIPLEXER STACKING

(75) Inventor: Qun Shi, Plainsboro, NJ (US)

(73) Assignee: UTStarcom, Inc., Alameda, CA (US)

( * ) Notice: Subject to any disclaimer, the term of this patent is extended or adjusted under 35 U.S.C. 154(b) by 235 days.

(21) Appl. No.: 10/346,485

(22) Filed: Jan. 16, 2003

(65) Prior Publication Data

US 2004/0141609 A1 Jul. 22, 2004

(51) Int. Cl.
*H04L 12/56* (2006.01)

(52) U.S. Cl. .................. 370/419; 370/217; 370/420; 379/399.01

(58) Field of Classification Search ........ 370/419–421; 709/250
See application file for complete search history.

(56) References Cited

U.S. PATENT DOCUMENTS 6,680,904 B1 * 1/2004 Kaplan et al. ............. 370/217
6,801,533 B1 * 10/2004 Barkley ..................... 370/395.2
6,822,944 B1 * 11/2004 Mantin ...................... 370/254
2002/0172273 A1 * 11/2002 Baker et al. ............... 375/222

* cited by examiner

*Primary Examiner*—Chi Pham
*Assistant Examiner*—Justin M. Philpott
(74) *Attorney, Agent, or Firm*—Felix L. Fischer (57) ABSTRACT

An architecture for stacking DSLAMs employs a master DSLAM having a control circuit and an uplink communication circuit to a central office and two LVDS circuits for communication with two DSLAM boxes in adjacent circuit interconnection to the master DSLAM. Multiple slave DSLAMs each having a programmable control circuit and two LVDS circuits for communication with two DSLAM boxes immediately adjacent on either side in the circuit are connected in a ring or split stack arrangement. A control circuit in the master selectively programs the control circuits in each slave DSLAM to control the direction of communication in the LVDS circuits as round robin in a first selected mode and a split in a second selected mode to accommodate the desired structure.

8 Claims, 11 Drawing Sheets

| ADSL Port # | Slave VCIs/VPIs | Box Virtual ID | Stacking I/O Mode* |
|---|---|---|---|
| xx - yy | VCI: x.xxx – x.yyy<br>VPI: y.xxx – y.yyy | x | Port A: I only, O only, or IO (Bidir)<br>Port B: I only, O only, or IO (Bidir) |

*Note: Stacking port (Utopia) A or B can be predefined as belong to which LVDS link during initialization.

FIG. 7

| ADSL Port # (Utopia) | External VCI/VPI | Slave VCIs/VPIs | Box Virtual ID | Master Stacking Mode | Stacking I/O Mode* |
|---|---|---|---|---|---|
| x1x2 – y1y2 | VCI: a.xxx – a.yyy<br>VPI: b.xxx – b.yyy | | 0 (Master) | 0 – Round robin<br>1 – Split Path | Port A: I only, O only, or IO (Bidir)<br>Port B: I only, O only, or IO (Bidir) |
| x3x4 – y3y4 | VCI: c.yyy<br>VPI: d.xxx – d.yyy | VCI: 1.xxx – 1.yyy<br>VPI: 1.uuu – 1.vvv | 1 (Slave) | N/A | Port A: I only, O only, or IO (Bidir)<br>Port B: I only, O only, or IO (Bidir) |
| x5x6 – y5y6 | VCI: e.xxx – e.yyy<br>VPI: f.xxx – f.yyy | VCI: 2.xxx – 2.yyy<br>VPI: 2.uuu – 2.vvv | 2 (Slave) | N/A | Port A: I only, O only, or IO (Bidir)<br>Port B: I only, O only, or IO (Bidir) |
| ... | ... | ... | ... | ... | ... |
| x15x16 – y15y16 | VCI: o.xxx – p.yyy<br>VPI: o.xxx – p.yyy | VCI: 7.xxx – 7.yyy<br>VPI: 7.uuu – 7.vvv | 7 (Slave) | N/A | Port A: I only, O only, or IO (Bidir)<br>Port B: I only, O only, or IO (Bidir) |

*Note: Stacking port (Utopia) A or B can be predefined as belong to which LVDS link during initialization.

METHOD AND APPARATUS FOR DIGITAL SUBSCRIBER LINE ACCESS MULTIPLEXER STACKING

FIELD OF THE INVENTION

This invention relates generally to the field of Digital Subscriber Line Access Multiplexers (DSLAMs) and, more particularly, to configuration and interconnection of DSLAMs to allow stacking efficiently with fault tolerance redundancy at low cost.

BACKGROUND OF THE INVENTION

Figure 1A:
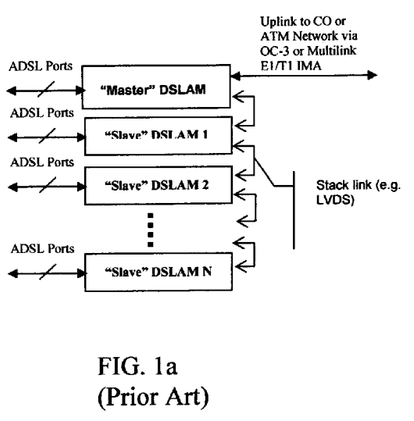
FIG. 1a is a prior art example of a single link daisy chain connection.
Figure 1B:
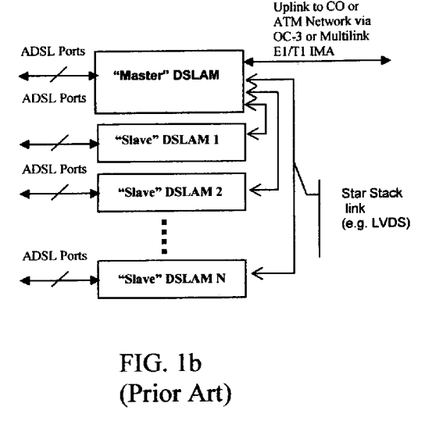
FIG. 1b is a prior art example of a star interconnection architecture.

Digital Subscriber Line Access Multiplexers are required for communications between digital subscriber line (DSL) users and the central office (CO). Typically, the "pizza box" sized DSLAMs are stacked at remote sites to provide higher density and ease of interconnection. Conventional stacking configurations of the DSLAMs are shown in FIGS. 1a and 1b of the drawings based on single link daisy chain and star respectively.

SUMMARY OF THE INVENTION

An architecture for stacking DSLAMs according to the present invention employs a master DSLAM having a control circuit and an uplink communication circuit to a central office and two LVDS circuits for communication with two DSLAM boxes in adjacent circuit interconnection to the master DSLAM. Multiple slave DSLAMs each having a programmable control circuit and two LVDS circuits for communication with two DSLAM boxes immediately adjacent on either side in the circuit are connected in a ring or split stack arrangement. A control circuit in the master selectively programs the control circuits in each slave DSLAM to control the direction of communication in the LVDS circuits as round robin in a first selected mode and a split in a second selected mode to accommodate the desired structure and to provide redundancy for failure by reprogramming from round robin to split to communicate around a failed slave DSLAM.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 2A:
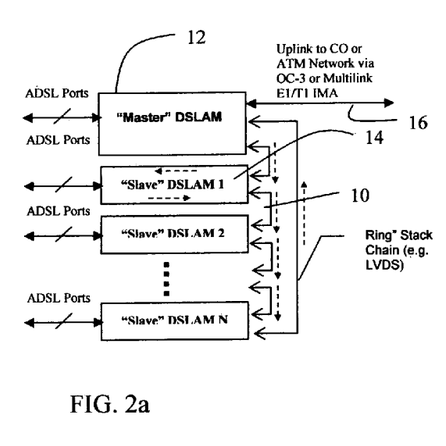
FIG. 2a is a schematic diagram of an exemplary embodiment of the present invention employing a ring structure with a round robin data path.
Figure 2B:
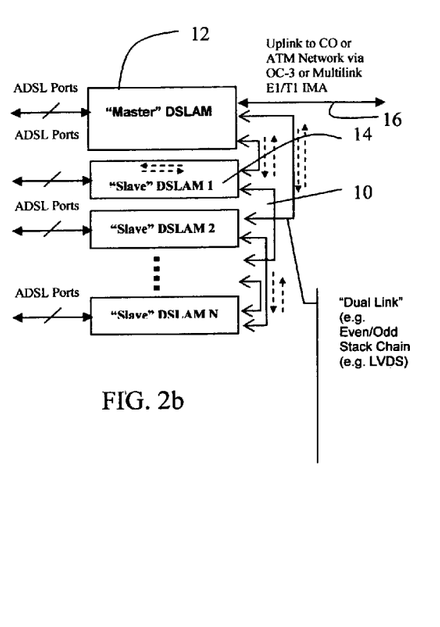
FIG. 2b is a schematic diagram of an exemplary embodiment of the present invention employing a split stacking with split data path.

The proposed method improves the conventional stacking approach by providing dual links between the master and slave boxes in a "ring" structure, such that redundancy is built-in and software controllable. Further, the data path route from master to slave is also software configurable. FIGS. 2a and b show the proposed new method of stacking based on "ring" or "dual link" architecture respectively. The stacking link 10 connecting the master box 12 and slave boxes 14 for the embodiments shown is based on low voltage differential signaling (LVDS) technology, designed to carry ATM traffic, as will be discussed in greater detail subsequently. The concept, however, can apply for other types of links. For illustration purposes, the uplink 16 for data traffic is shown as ATM based connecting to the central office (CO) or ATM network via OC-3 or (Multilink) E1/T1 IMA. In the "ring" structure with "round robin" data communication configuration shown in FIG. 2a, the data flows in one direction from one box to another (i.e. to the one stacked below). The last box down the chain completes the "ring" by following the same data path to the master. In the "dual link" structure with "split path" data communication configuration, the data flows bi-directionally (transmit/receive) from one box to another (i.e. to the one stacked below). The master splits the two traffic paths via software control, based either on virtual slave box identification numbers and/or ATM virtual path/virtual circuit numbers of a slave box.

Figure 2C:
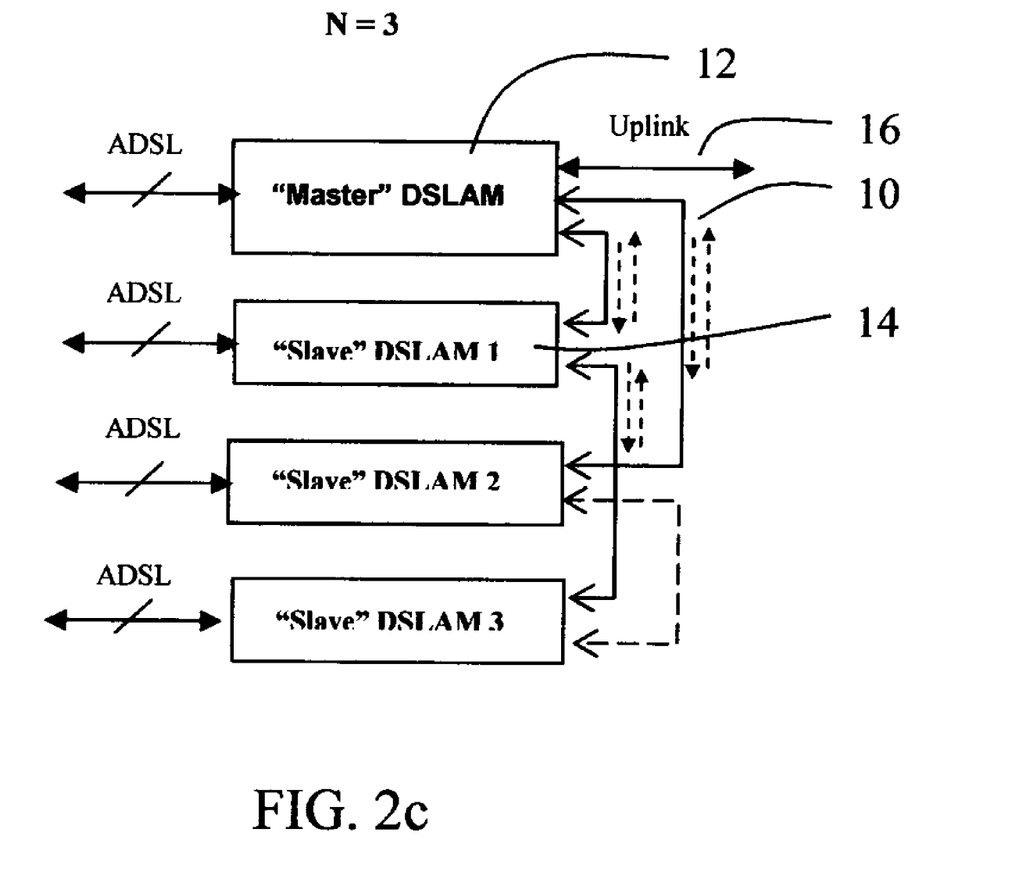
FIG. 2c is a block diagram of an exemplary embodiment of the invention for N=3.
Figure 2D:
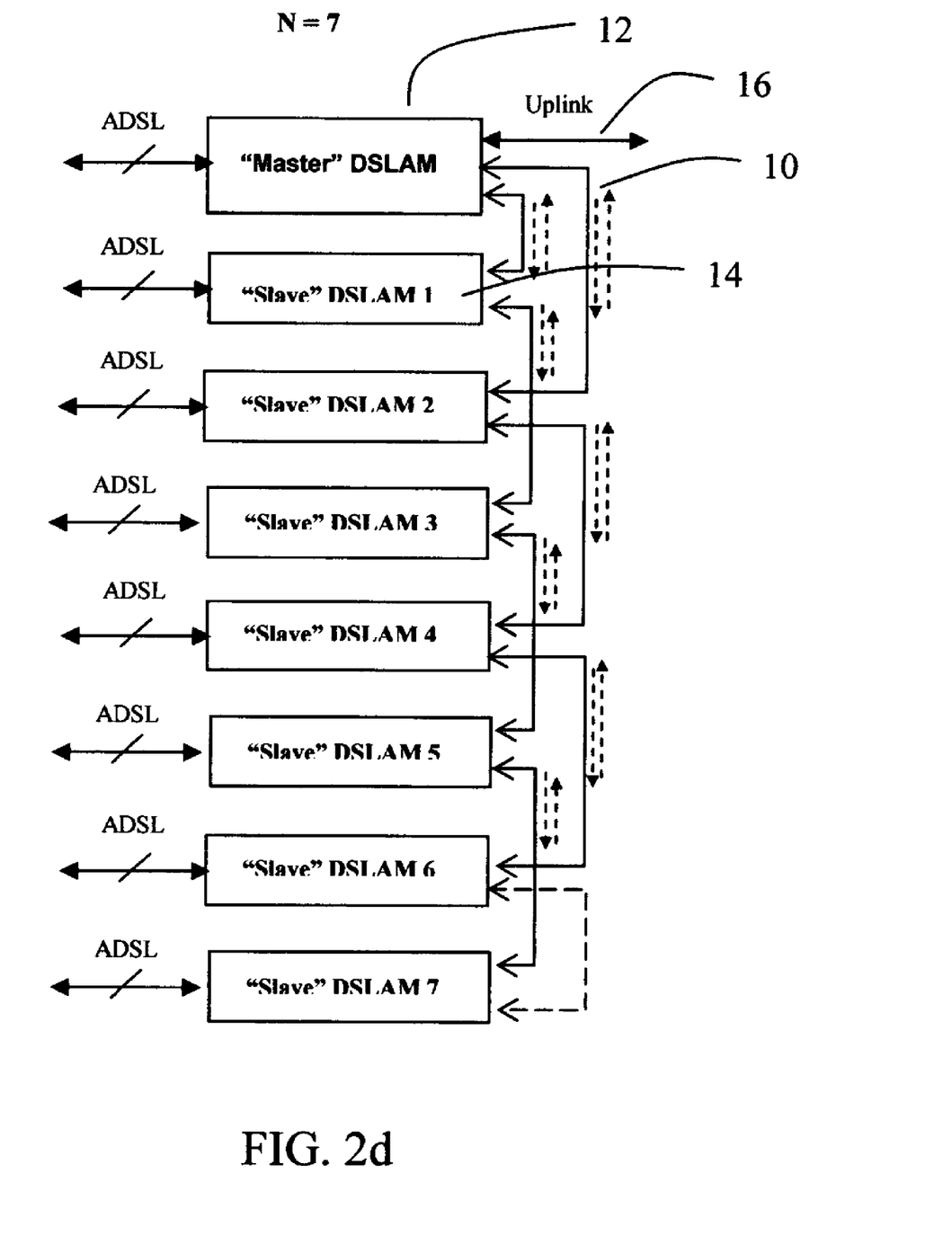
FIG. 2d is a block diagram of an exemplary embodiment of the invention for N=7.

The configuration described is further illustrated in FIGS. 2c and 2d for N=3 and N=7 respectively. Here, the Master to Slave and Slave to Slave interconnections alternate in each link, as shown. In one link, for example, the chain connection order is from Master to Slave 1 to Slave 3, etc. In the other link, the chain order is from Master to Slave 2 to Slave 4, etc. The last two slave boxes in each chain link then connect with each other on link 10' to complete the loop for the purpose of redundancy and traffic redirection in case a failure occurs as will be described in greater detail subsequently.

An additional alternative or simple dual link connection will be the same as shown in FIG. 2a, but the traffic path is reprogrammed by the Master to be bi-directional on each link. The two paths will be, for an example of N=7, (a) Master to Slave 1, 2, 3 and (b) Master to Slave 7, 6, 5, and 4. In this case, the link interconnection between Slave 3 and Slave 4 will not be used for data traffic but for redundancy.

A third alternative provides the two slave boxes connecting to the Master are the first Slave and a middle slave. In case of N=3, the middle slave will #2. One link connects Master and Slave 1, and the other link connects Master and Slave 2 and then Slave 3. For N=7, the middle slave will be 4 and one link will be Master and Slave 1 and then 2 and 3. The other link will be Master and Slave 4, and then 5 to 7. Again, the loop closes by linking together Slaves 1 and 3 for N=3 or Slaves 3 and 7 for N=7, for the purpose of redundancy. Note that with this configuration, the longest delay between master and slave is substantially half of that with the "ring" configuration or single link daisy chain.

The flexibility of the invention allows this configuration to also be used for a Round Robin daisy chain link since the virtual "position" of the slave DSLAMs is programmable. The data path can be programmed at the initialization phase to be uni-directional on the link, i.e., in the order of Master to Slave 1 to Slave 3 to Slave 2 to Master for N=3, and Master to Slave 1 to Slave 3 to Slave 5 to Slave 7 to Slave 6 to Slave 4 to Slave 2 to Master for N=7. In this case, the last link (10') will also be used for data traffic. The link path can be reconfigured by the Master to bi-directional as shown in FIG. 2d when a failure occurs.

Figure 3:
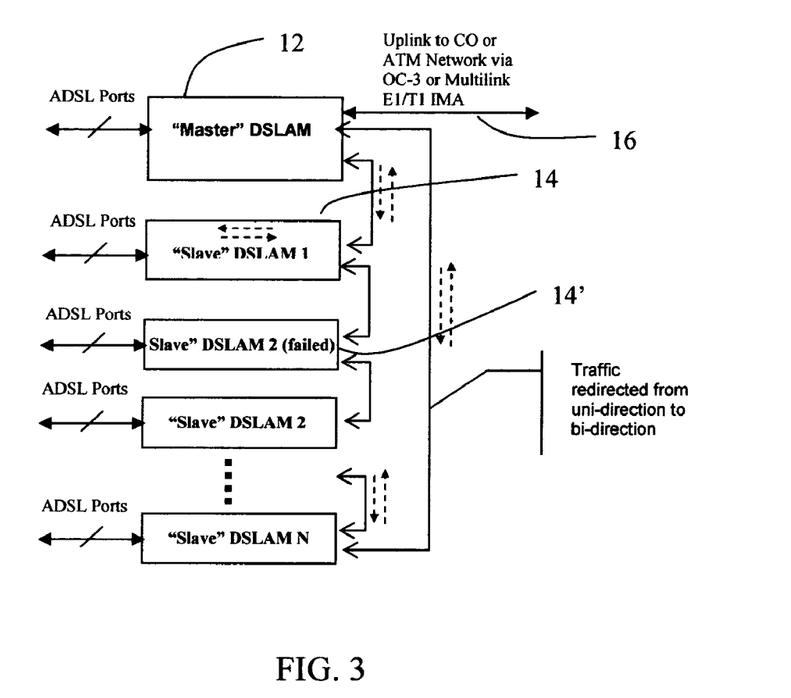
FIG. 3 is a schematic diagram illustrating the traffic redirection capability of the redundant structure of the present invention.

FIG. 3 shows an example of the reliability feature or self-healing available with the method of the present invention. As shown for a ring stack chain physical configuration, one slave box 14' going down will not affect the operation of the rest of the stacked boxes. The master can redirect traffic when informed the failure has occurred in one of the slave boxes by converting the traffic in the slave boxes to split path with bi-direction communication on both sides of the "down" slave box with communication to the master box at both ends of the chain. For the configurations described above with respect to FIGS. 2c and 2d, the link 10' is activated for normal communication.

Detecting a failure/malfunction of a slave DSLAM is accomplished by the Master for the embodiments shown in one of several approaches. A first approach is for Master to periodically send a "heart-beat" message to each slave by means of polling in a round robin fashion. If the slave being polled (identified by virtual ID) does not respond within a predesignated time, the Master will consider it has failed and redirect traffic around that slave.

A second approach is that the slaves communicate with each other by sending heart-beat messages. As an example, the architecture can be programmed by the Master such that the box that is stacked "on top" always sends messages to the one that is stacked "below" or next in communication sequence. In the round-robin chain case, the Master sends heart-beat to Slave 1, Slave 1 sends the heart-beat to Slave 2. When the box receiving the heart-beat message does not respond within certain time, the box sending the message will consider that box being failed and inform the Master using the reserved in-band communication channel (as described below).

Figure 4:
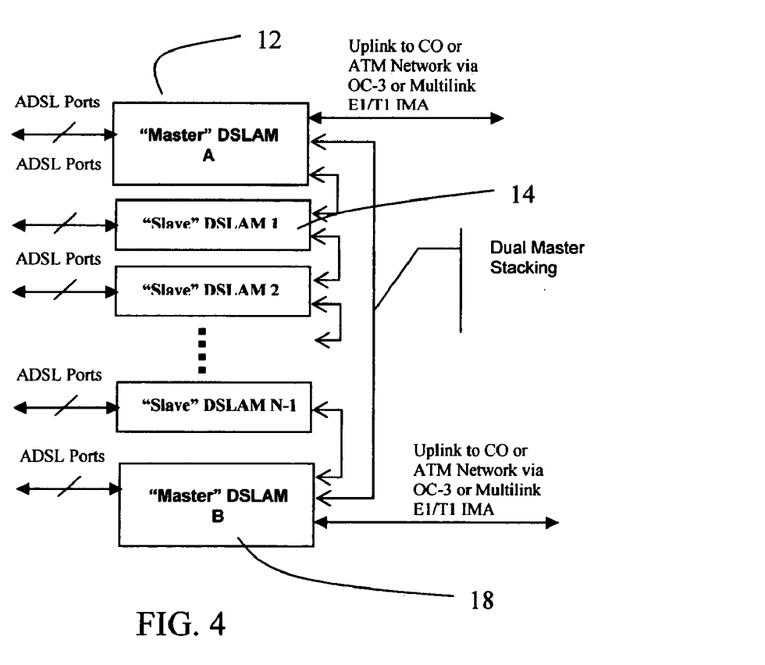
FIG. 4 is a schematic diagram of dual master stacking possible with the present invention; and, FIG. 5 is a detailed schematic diagram of the main functional blocks of the master and slave DSLAMs in a configuration according to the present invention.

FIG. 4 shows an embodiment of the present invention with a dual master configuration with a second master box 18, providing full protection in the event one master fails. Coordination between the two masters is employed, in terms of traffic and configuration, such as active/standby, shared active/active, etc.

Figure 5:
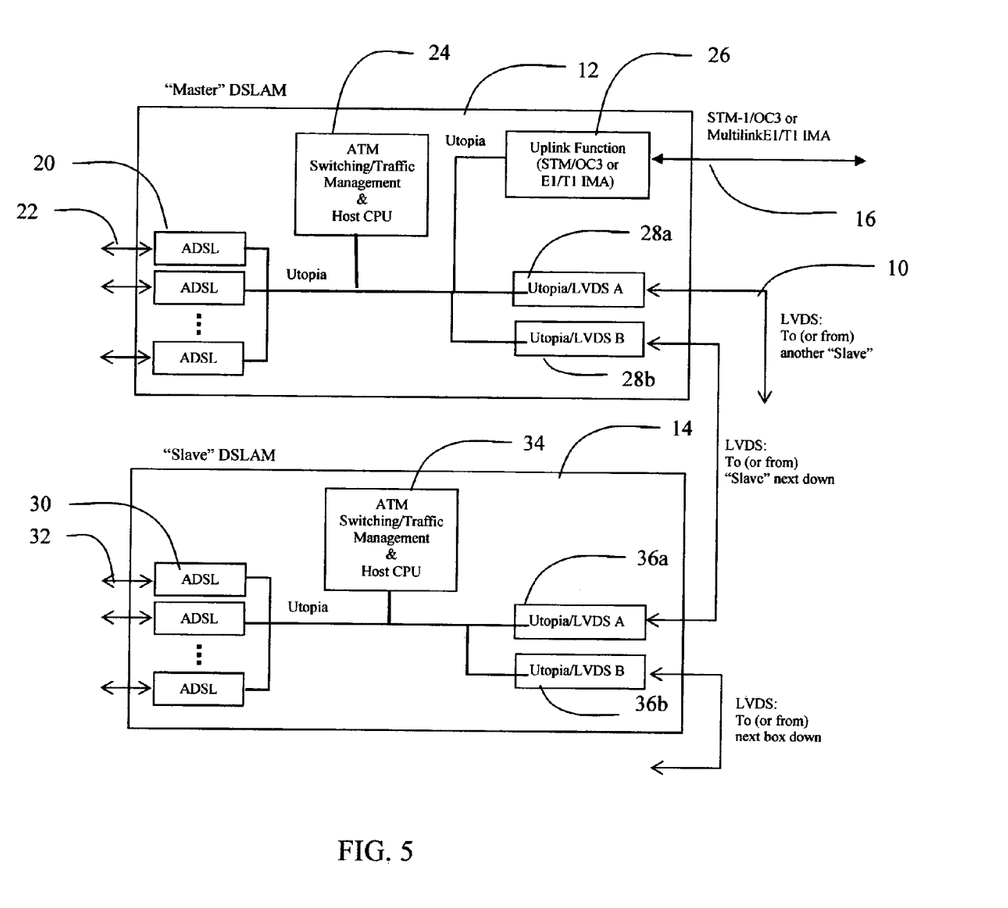

FIG. 5 shows the internal main functional architecture of the master and slave DSLAMs and a general stacking arrangement. The master box incorporates multiple ADSL interfaces 20 for connection to the user lines 22. A control circuit 24 with a central processing unit (CPU) and ATM switching and traffic management controls the master DSLAM. An uplink circuit 26 provides communication with the CO using STM/OC3 or multilink EI/TI IMA. Communication with the slave boxes is provided by multiple LVDS circuits 28a and 28b.

Each slave box also has multiple ADSL interfaces 30 for connection to the user lines 32. A control circuit 34 with a central processing unit (CPU) and ATM switching and traffic management controls the slave DSLAM under software control by the master. LVDS ports 36a and 36b interconnect the slave box for communication with each box adjacent in the circuit connection, either master or slave. The control circuit in the master DSLAM provides software instruction to the slave DSLAMs for establishing the communication direction as round robin or split, i.e. bi-directional, as will be described in greater detail subsequently. With the physical connection in a ring stack chain, the normal communication path would be round robin. However, failure of one slave box can be overcome by the master reprogramming the slaves to communicate in split format thereby automatically reconfiguring the circuit arrangement to a dual link configuration as previously described with respect to FIG. 3.

Figure 6:
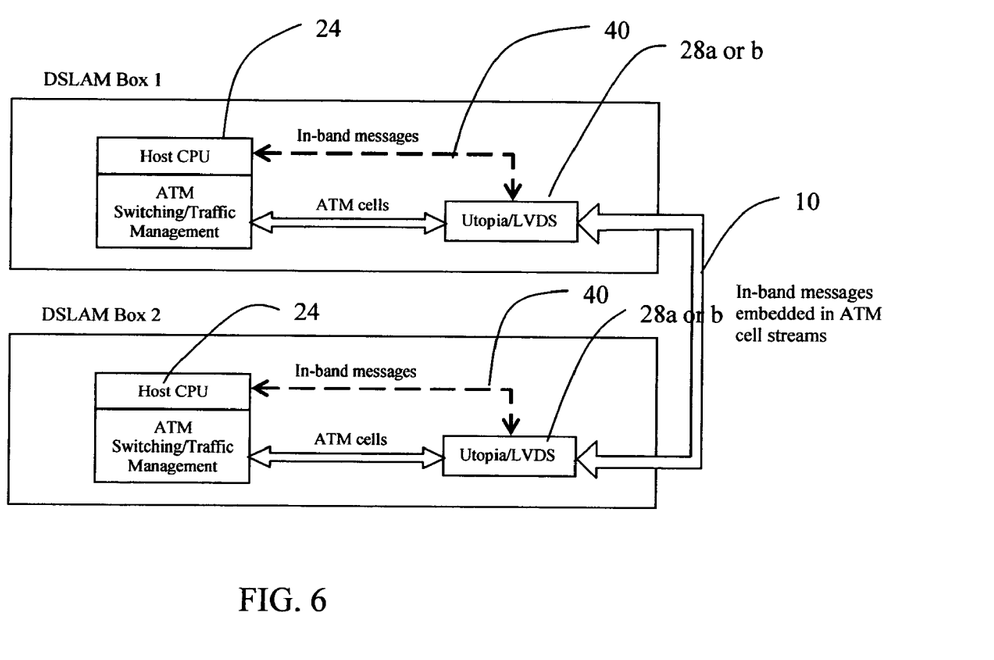
FIG. 6 is a schematic demonstration of an embodiment for communications between DSLAMs employing the present invention.

The communications between the Master and Slaves and between the Slave DSLAMs for the embodiments shown are based on in-band communications carried within the LVDS link and ATM cell streams. This is also the CPU to CPU communication means between two DSLAM boxes via an in-band LVDS channel. FIG. 6 demonstrates this embodiment in schematic form. The CPU messages are inserted into the ATM cell streams by the LVDS circuit through the CPU interface as represented by links 40. The in-band communications are transmitted by the LVDS with the ATM cell streams on links 10 between DSLAMs.

Figure 7:
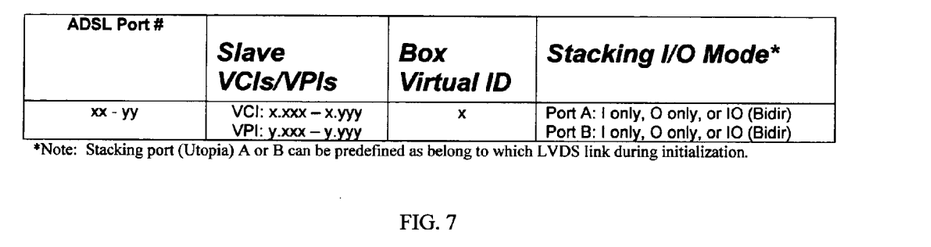
FIG. 7 shows an example of the relay/stacking I/O table in a Slave DSLAM.

Communication between the master and slave boxes employs a proxy and/or relaying traffic mechanism/scheme for data and management messages, based on virtual box identification and virtual path/circuit identifications. Each Slave DSLAM maintains a traffic relay and stacking I/O table that does the virtual channel and box ID mapping. The table is updated whenever instructed by the Master via in-band communication channel. FIG. 7 shows an example of the relay/stacking I/O table in a Slave DSLAM. The table incorporates the ADSL port numbers connected to the DSLAM, the VCI/VPIs for the Slave DSLAM, the virtual ID for the DSLAM and the Stacking Input/Output mode for each of the two LVDS ports. The stacking ports in the Utopia LVDS configuration shown for the embodiments in the drawings can be predefined as belonging to the "A" or "B" LVDS link during initialization. Each port can be programmed for input, output or bi-directional (input and output) communication.

Figure 8:
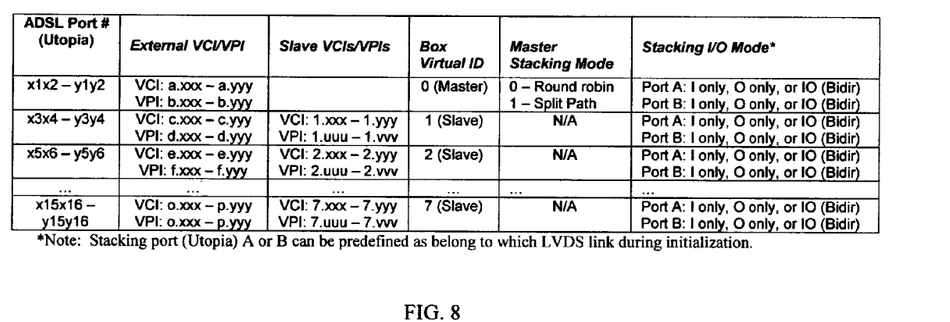
FIG. 8 illustrates an example of the proxy table in the Master for the embodiment of FIG. 2d with N=7.

The Master DSLAM maintains a "proxy" table for all slaves, which includes VCI/VPI cross-connect information and mapping between external VCI/VPI to internal (slave) VCI/VPI, as well as stacking I/O configuration. FIG. 8 illustrates an example of the proxy table in the Master for the embodiment of FIG. 2d with N=7. The proxy table contains the information present in the tables for each of the Slaves and an additional data item defining the Master Stacking Mode for round robin or split path. The Stacking Input/Output mode established by the Master will be determined by the Stacking mode as previously described. Failure mode recovery can be accomplished by the Master as previously described resulting in a change in the Stacking mode and bypassing of a failed Slave DSLAM in the communications path.

Figure 9:
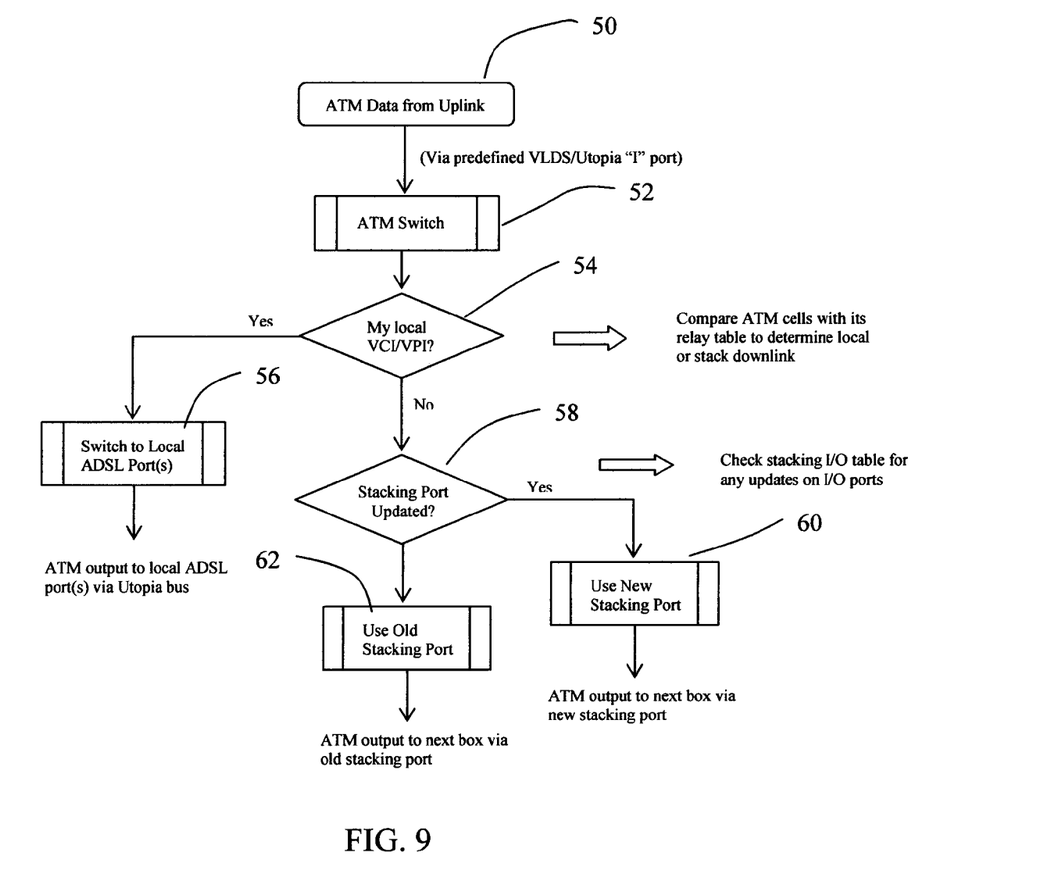
FIG. 9 illustrates the communications relaying scheme for the Slaves' downlink path.
Figure 10:
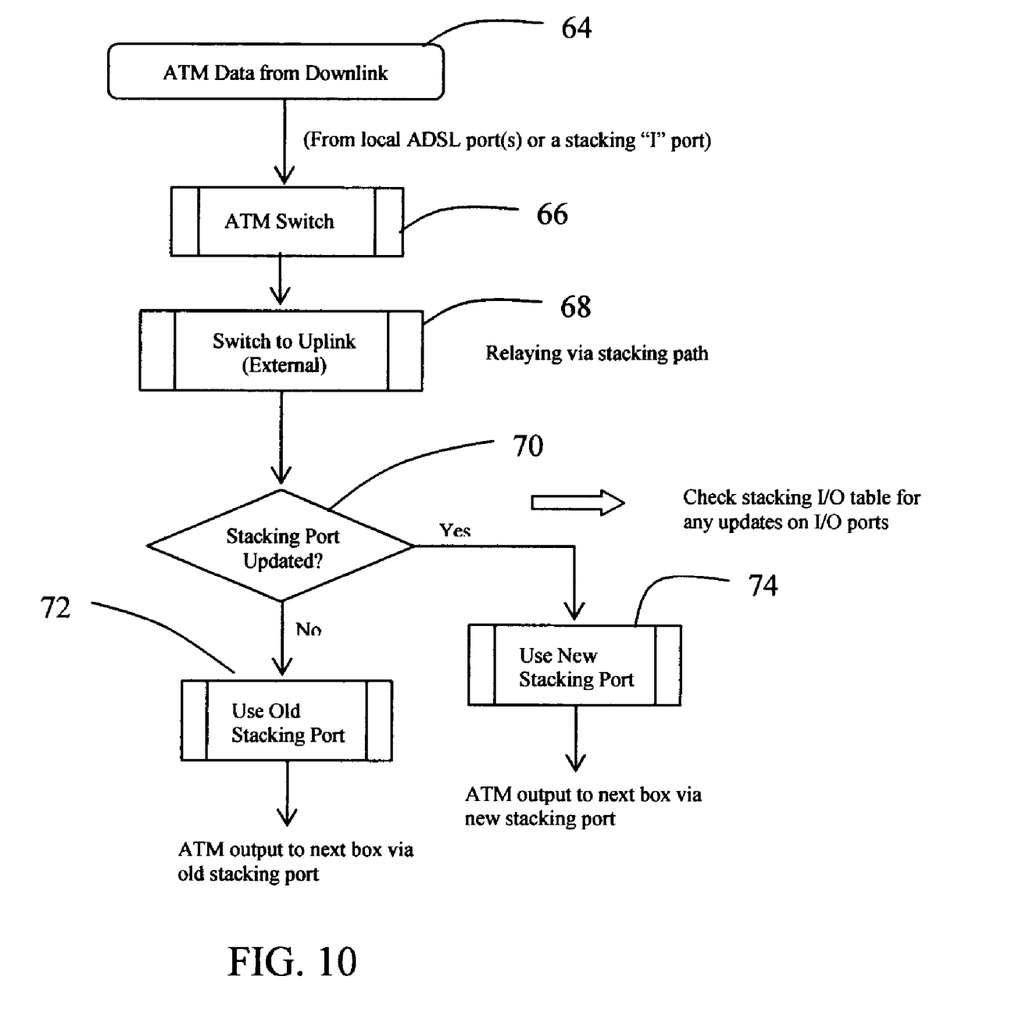
FIG. 10 illustrates the communications relaying scheme for the Slaves' uplink path.

The communications relaying scheme for the Slaves is illustrated in FIGS. 9 and 10 for downlink and uplink paths respectively. Referring to FIG. 9, the ATM data from the uplink is received by a DSLAM in block 50 and routed through an ATM switch 52. A determination is made in block 54 comparing the ATM cells with the DSLAM traffic relay and stacking table to determine if the communication is local or should be downlinked in the stack. If the communication is intended for an ADSL port in the DSLAM, it is switched to the appropriate local ADSL port in block 56. If the communication is to be passed through, a check of the stacking I/O table is made to determine the transfer port in block 58. If the I/O table has been updated, the communication is passed to the new stacking port in block 60 for ATM output to the next DSLAM as defined by the new stacking port data. If the I/O table has not been updated, the communication is passed to the old stacking port in block 62 for ATM output to the next DSLAM as defined by the old stacking port data.

Uplinking of data is shown in FIG. 10 where ATM data from the Downlink is received in block 64 from the local ADSL ports in the DSLAM or from the stacking input port. The data is routed through the ATM switch 66 and to the uplink switch 68 for external communication. A check of the stacking I/O table is made to determine the transfer port in block 70. If the I/O table has not been updated, the communication is passed to the old stacking port in block 72 for ATM output to the next DSLAM as defined by the old stacking port data. If the I/O table has been updated, the communication is passed to the new stacking port in block 74 for ATM output to the next DSLAM as defined by the new stacking port data.

Figure 11:
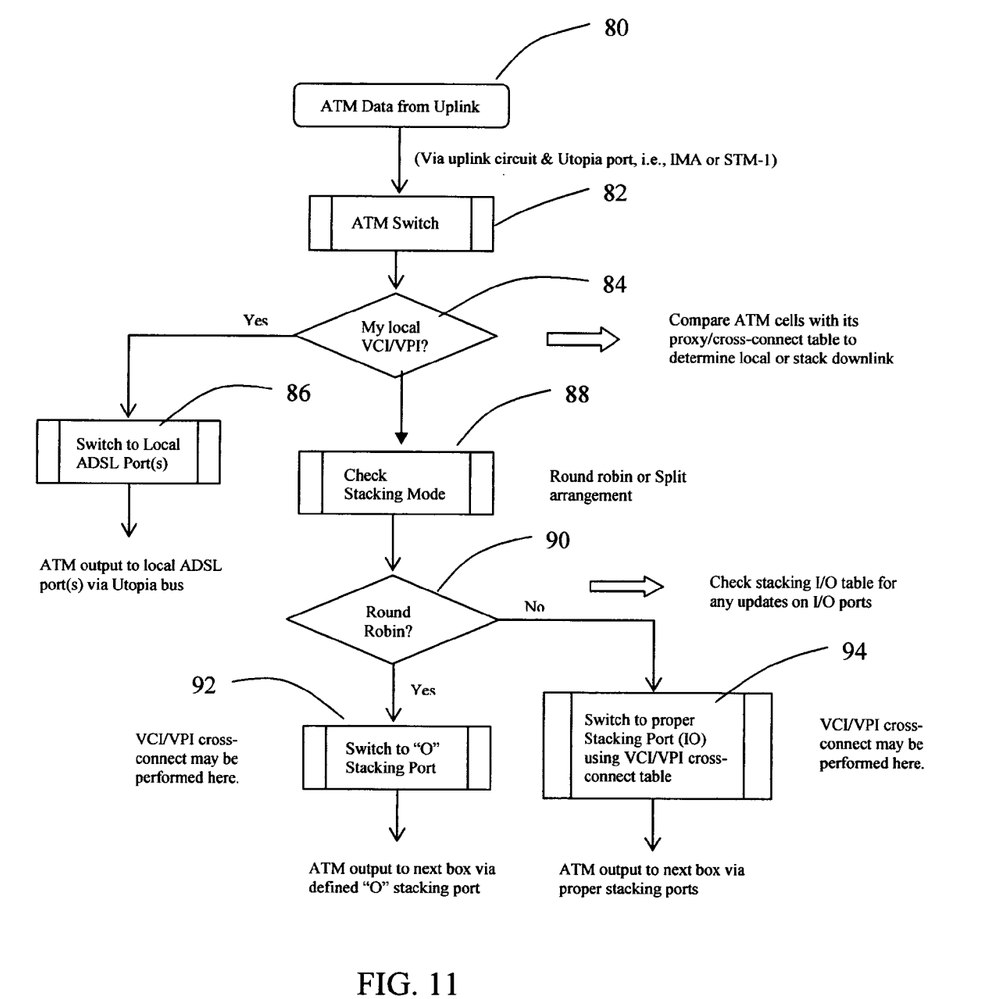
FIG. 11 is a flow chart depicting ATM uplink communications in an embodiment of the invention.

Uplink and downlink communications for the Master DSLAM are conducted based on the proxy table previously described with respect to FIG. 8. As shown in FIG. 11, ATM data is received by the Master from the uplink in block 80 through the ATM switch 82. A determination 84 is made whether the ATM cells correspond to a local ADSL port for the Master or require a stack downlink. If local the ATM cells are switched to the appropriate local DSL port in block 86, if not, a check 88 is made to determine the stacking mode. If a determination is made in block 90 that the round robin mode is present, the Master switches to the output stacking port previously defined in block 92. The proxy table allows conversion of the external VCI/VPI to internal (slave) VCI/VPI for downlink. If a split mode is used, a switch to the proper stacking port is made using the VCI/VPI cross connect table in block 94.

Figure 12:
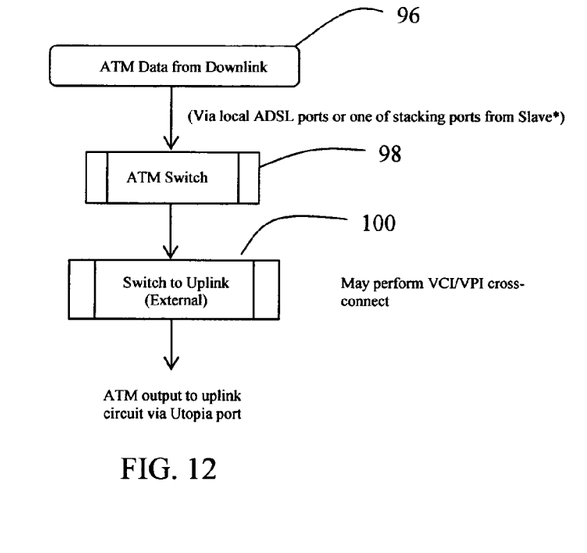
FIG. 12 is is a flow chart depicting ATM downlink communications in an embodiment of the invention; and, FIG. 13 is a state diagram for in-band communications in an embodiment of the invention.

The uplink proxy path is shown in FIG. 12. ATM data from the local ADSL port in the Master or downlink slave DSLAM is received in block 96 through the ATM switch 98 and transmitted through the uplink in switch 100 with the Master conducting the VCI/VPI cross connect as required pursuant to the proxy table.

Heartbeat communications and failure reprogramming are accomplished by the Master DSLAM using inband messaging as previously described. For the case of a Round-Robin chain link in the embodiments shown, the failure sensing schemes reserve the in-band communication channel that is in the reverse direction of the normal ATM traffic, in order to inform the Master when failure occurs. For the case of split-path chain link, however, since each link is already bi-directional, the in-band communication channel is carried over the normal ATM traffic.

The Master reprograms the Slave path direction in case of failure through the in-band communication channel by sending down stacking path I/O messages to each of the Slave boxes (minus the failed one). The Slave boxes then update their corresponding I/O tables. The Master incorporates a simple state machine that tracks the operating condition of each Slave box in its stacking control circuit.

Similarly, when the failed DSLAM box is recovered to be operational again, it will inform the Master through the in-band communication channel to notify that it is alive. The Master then will either update the I/O table of all the Slaves including the recovered one, or by updating only the recovered Slave of its normal traffic I/O path that follows the rest of the traffic directions.

Figure 13:
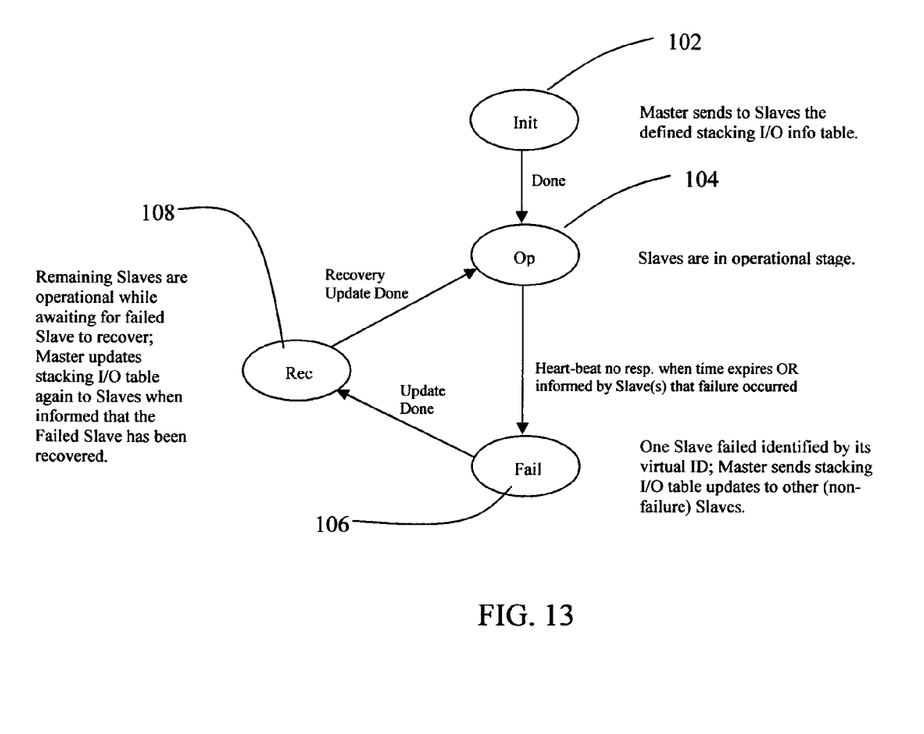

The state machine for the described in-band communications is shown in FIG. 13. At start-up, the Master sends an initialization communication 102 to define the stacking I/O information table for each DSLAM. As long as all Slaves remain operational, state 104, in response to heartbeat signals, communications proceed based on the initialized settings. If no heart-beat response is received or a failure notification is received, the Master enters state 106, identifies the failed Slave by its virtual ID and sends stacking I/O table updates to the remaining operational slaves. The remaining Slaves continue operation with the revised I/O stacking tables until the failed Slave communicates with the Master that it is recovered. Upon such notification, the Master enters state 108 and again sends updated stacking I/O table information to all Slaves in the stack before returning to the Operational state 104.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. An architecture for stacking Digital Subscriber Line Access Multiplexers (DSLAMs) comprising:
   a single master DSLAM having a control circuit and an uplink communication circuit to a central office and two low voltage differential signaling (LVDS) circuits for communication with two DSLAM boxes in direct adjacent circuit interconnection to the single master DSLAM;
   a plurality of slave DSLAMs each having a programmable control circuit and two LVDS circuits for communication with two DSLAM boxes in adjacent virtual circuit interconnection; and
   means for selectively programming the control circuits in each slave DSLAM to control the direction of communication in the LVDS circuits in said each slave DSLAM as round robin in a first selected mode and a split in a second selected mode, said split selectively programmed at a desired virtual circuit connection adjacent to the single master DSLAM for communication only through that single master DSLAM.

2. An architecture for stacking DSLAMs as defined in claim 1 wherein the two DSLAM boxes in adjacent circuit connection to the single master DSLAM are a first and a last slave DSLAMs to form a ring structure.

3. An architecture for stacking DSLAMs as defined in claim 1 wherein the two DSLAM boxes in direct adjacent circuit connection to the master are a first and a middle slave DSLAMs to form a dual link structure.

4. An architecture for stacking DSLAMs as defined in claim 1 wherein the means for selectively programming the slave DSLAMs employs a proxy scheme for data and management messages, based on virtual box identification and virtual path/circuit identifications.

5. An architecture for stacking DSLAMs as defined in claim 1 wherein the means for selectively programming the slave DSLAMs employs a relaying traffic mechanism for data and management messages, based on virtual box identification and virtual path/circuit identifications.

6. An architecture for stacking DSLAMs as defined in claim 1 further comprising means for detecting failure of one of the slave DSLAMs and wherein the means for selectively programming is responsive to the means for detecting failure to allow reprogramming from a round robin to split path communication around the failed slave DSLAM while retaining communication only through the single master DSLAM.

7. An architecture for stacking DSLAMs as defined in claim 6 further comprising a standby master wherein upon failure of the single master DSLAM, the standby master is enabled for operation as a single master having a control circuit and an uplink communication circuit to a central office and two low voltage differential signaling (LVDS) circuits for communication with two DSLAM boxes in direct adjacent circuit interconnection to the single master DSLAM and said means for selectively programming reprograms from a round robin to split path communication around the failed single master DSLAM while retaining communication through the standby master as a new single master DSLAM said split selectively programmed at a desired virtual circuit connection adjacent to the standby master for communication through the standby master.

8. An architecture for stacking Digital Subscriber Line Access Multiplexers (DSLAMs) comprising:

a single master DSLAM having a control circuit and an uplink communication circuit to a central office and two low voltage differential signaling (LVDS) circuits for communication with two DSLAM boxes in direct adjacent circuit interconnection to the single master DSLAM;

a plurality of slave DSLAMs each having a programmable control circuit and two LVDS circuits for communication with two DSLAM boxes in adjacent virtual circuit interconnection; and means for selectively programming the control circuits in each slave DSLAM to control the direction of communication in the LVDS circuits in said each slave DSLAM as round robin in a first selected mode and a split in a second selected mode, said split selectively programmed at a desired virtual circuit connection adjacent to the single master for communication through that single master DSLAM;

means for detecting failure of one of the slave DSLAMs and wherein the means for selectively programming is responsive to the means for detecting failure to allow reprogramming from a round robin to split path communication around the failed slave DSLAM while retaining communication through the single master DSLAM; and a standby master wherein upon failure of the single master, the standby master is enabled for operation as a single master having a control circuit and an uplink communication circuit to a central office and two low voltage differential signaling (LVDS) circuits for communication with two DSLAM boxes in direct adjacent circuit interconnection to the single master DSLAM, and said means for selectively programming reprograms from a round robin to split path communication around the failed single master DSLAM while retaining communication through the standby master as a new single master DSLAM, said split selectively programmed at a desired virtual circuit connection adjacent to the standby master for communication through the standby master.

* * * * *